E. B. CALKINS.
SAFETY CRANKING DEVICE.
APPLICATION FILED OCT. 12, 1910.
1,002,899.
Patented Sept. 12, 1911.
2 SHEETS—SHEET 2.
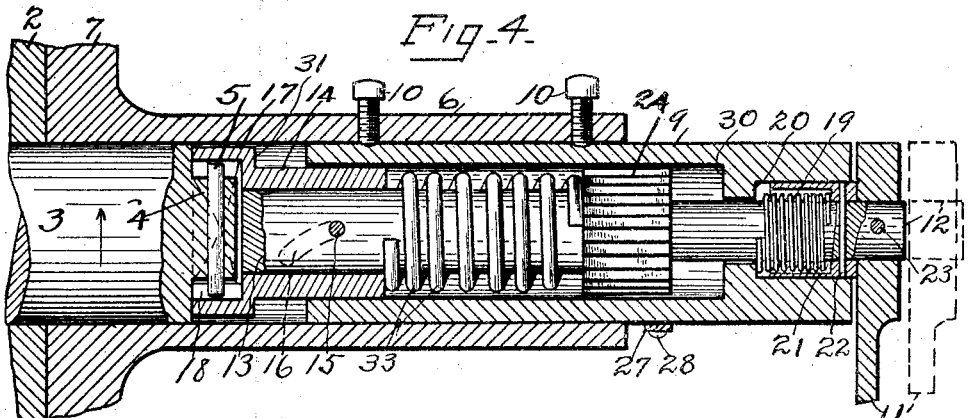
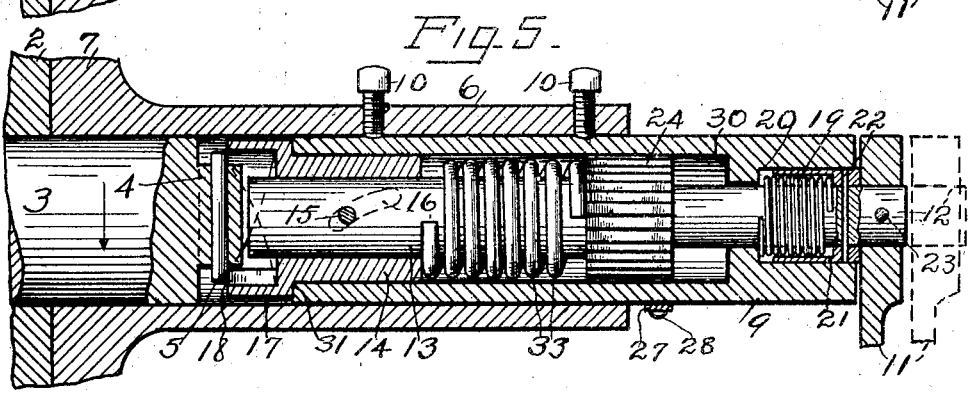
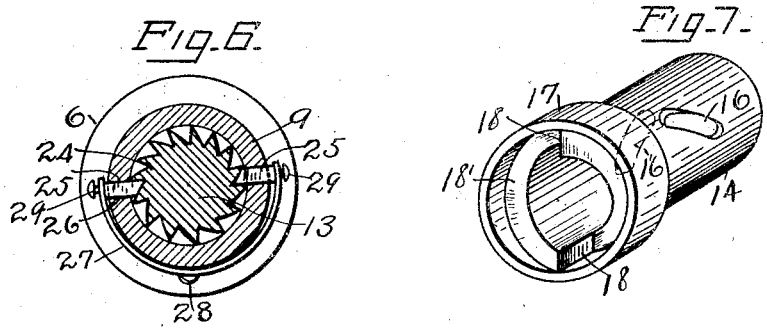
WITNESSES:
INVENTOR.
EDMUND B. CALKINS
BY
ATTORNEY.

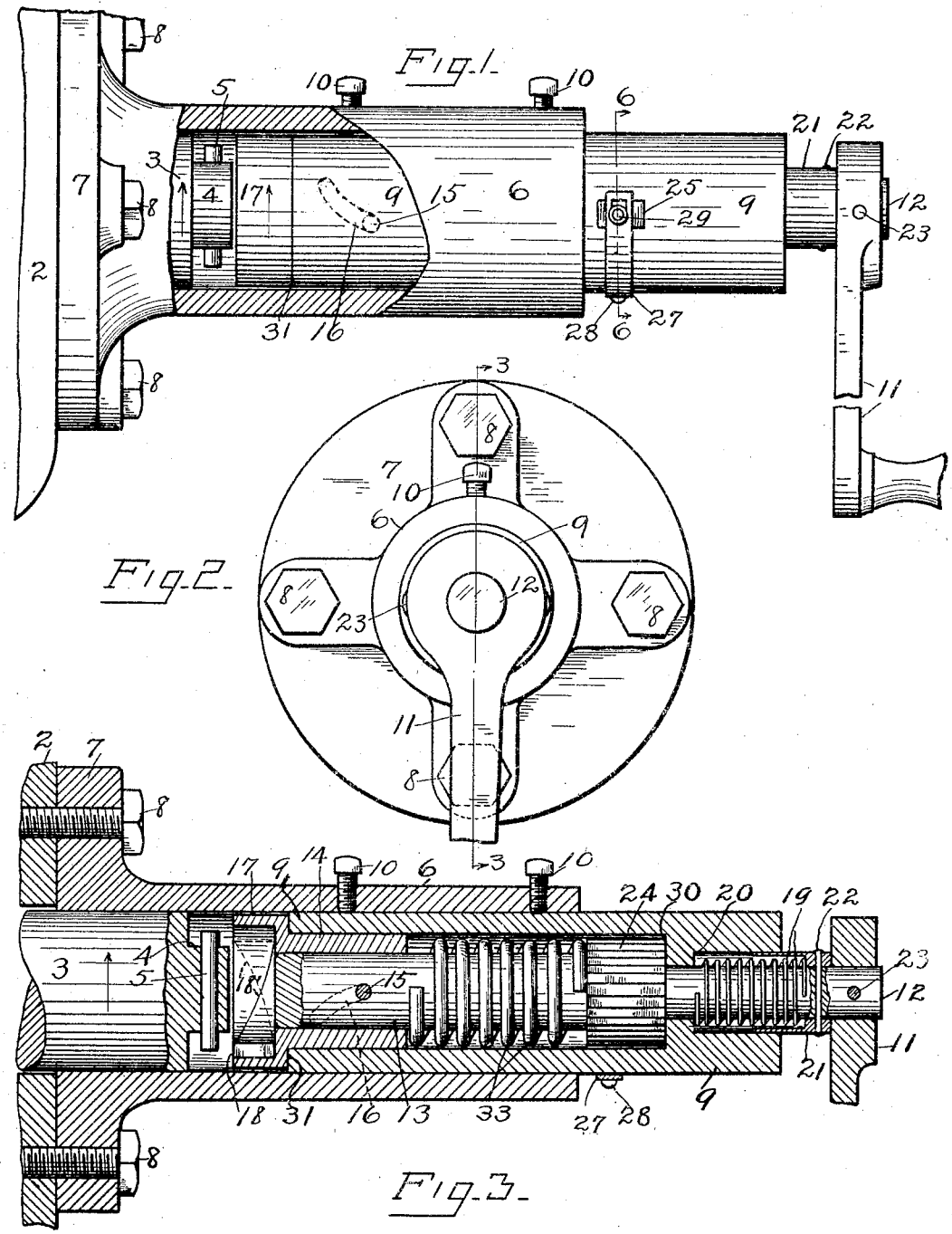

UNITED STATES PATENT OFFICE.

EDMUND B. CALKINS, OF WATERTOWN, NEW YORK.

SAFETY CRANKING DEVICE.

1,002,899. Specification of Letters Patent. Patented Sept. 12, 1911.

Application filed October 12, 1910. Serial No. 586,676.

*To all whom it may concern:*

Be it known that I, EDMUND B. CALKINS, a citizen of the United States, residing at Watertown, in the county of Jefferson and State of New York, have invented certain new and useful Improvements in Safety Cranking Devices, of which the following is a specification.

This invention relates to improvements in safety cranking devices, and has for its object to provide a safe and effective cranking mechanism for use in starting gas or other explosion engines.

A particular object is to provide a safety device to be applied between the usual starting crank and the crank shaft or fly wheel of an engine, and arranged to operatively connect with each of these parts, for the purpose of starting the engine, and for preventing injury to the operator due to the back-firing and sudden reversing or starting of the engine.

My invention consists of the various details of construction, arrangement and combination of the parts of the device, whereby the objects contemplated are obtained, as hereinafter more fully set forth, pointed out in the claims, and illustrated in the accompanying drawings forming a part of this specification, in which—

Figure 1 is a side elevation and part section; showing the device applied to an engine, the cranking parts being shown in idle position. Fig. 2 is an end view of the device. Fig. 3 is a vertical longitudinal section, on line 3—3 of Fig. 2; showing the construction and arrangement of the device, as when all of the parts are in idle or resting position. Fig. 4 is a similar longitudinal section showing the device operatively connected to the shaft of the engine ready for the cranking operation. Fig. 5 is a similar sectional view showing the automatic releasing of the clutch when the engine back fires. Fig. 6 is a cross section on line 6—6 of Fig. 1; showing the ratchet and pawl mechanism. Fig. 7 is a perspective view of the female clutch member.

In the drawings, 2 represents the crank-box of a gas or other explosion engine, and 3 the crank shaft of the engine, which projects through the casing 2, and is preferably reduced at its free end 4, and provided with a pin or a series of projecting parts 5. These two latter parts comprise the male member of the usual clutch employed for starting the engine. The male clutch member may be detachably applied to the crankshaft 3 if desired. It is preferred to support my safety cranking device by means of a cheek-piece, which consists of a cylindrical part 6, having a flange 7, by means of which the support is secured to the casing 2 of the engine, by a series of bolts or screws 8. The cheek-piece 6 is preferably bored out to uniform diameter throughout its length. Any other suitable form of support may be employed instead of the cheek-piece, which I do not claim as part of my invention.

My safety cranking mechanism comprises the following parts: 9 represents a cylinder which may be inserted part way into the cheek-piece 6, and is held in rigid position by set-screws 10. The cylinder 9 is bored out from end to end to receive certain of the working parts of the device. 11 represents the usual hand starting-crank such as employed for cranking the engines of automobiles, which is mounted upon the reduced outer end 12, of an auxiliary shaft or rod 13, which is disposed concentrically in the cylinder 9. Shaft 13 is longer than the cylinder 9, so that its opposite ends normally project slightly beyond the ends of said cylinder. Shaft 13 should be positioned truly concentric to the crank-shaft 3 of the engine. Upon the inner end of shaft 13 is mounted a female clutch member, which consists of a sleeve 14, which operatively fits the enlarged end of shaft 13, and is held in place upon, and driven with said shaft by means of a pin 15 which pierces both sleeve 14 and shaft 13. The ends of pin 15 are disposed in reversely arranged oblique slots 16—16 which are cut in the opposite sides of the sleeve 14, the arrangement of the slots 16 being such that, when pressure is applied to either end of the sleeve, this part may be moved longitudinally and also spirally along shaft 13, a distance corresponding to the length of the slots. The diameter of sleeve 14 is preferably the same as the larger bore of the cylinder 9, and serves to hold shaft 13 concentric in said cylinder. The outer end of sleeve 14 is formed into an enlarged hollow cup or head 17, which is provided interiorly with oppositely facing clutch jaws 18, for engaging the pin or projections 5 of the crank-shaft 3, for turning said shaft in the direction for starting the engine. The arrangement of the jaws 18 should be such that when the crank 11, shaft 13 and clutch member 17 are rotated by the operator or engineer, the jaws will positively engage the pin 5 for starting the engine in its running direction. The arrangement of the clutch members may be varied to suit either a left or right hand operator. The female clutch member comprising sleeve 14 and the head 17 are normally held in idle position,—out of engagement with the male clutch member 5, by means of a coil spring 19 which is carried by shaft 13. The inner end of spring 19 bears against a shoulder 20 which is formed by counter-boring the outer end of cylinder 9. The outer end of spring 19 is inserted in a counter-bored sleeve 21, which is secured to the shaft 13, by a pin 22. The outer end of sleeve 21 serves as a stop for the crank 11, the latter being made rigid on shaft 13, by a pin 23. The shaft 13 is intended to be rotated in but one direction, that is to say, in the direction for starting the engine, and this shaft is prevented from rotating in the opposite direction, by means of a ratchet gear 24, and a series of pawls 25—25, which are disposed in perforations 26 formed in the opposite sides of the cylinder 9. The pawls are constantly held in engagement with the teeth of the ratchet 24 by a spring 27 which is secured to the cylinder 9, by a screw 28. The free ends of spring 27 are perforated to receive screws or studs 29 carried by the pawls 25.
The outer end of ratchet 24 when the device is at rest, normally bears against a shoulder 30 within the cylinder 9, and it is held in such position by the spring 19 which constantly exerts its tension to hold shaft 13 and the female clutch member away from crank-shaft 3, as shown in Figs. 1 and 3. When the parts are in the latter position shoulder 31 of the female clutch member bears against the inner end of the cylinder 9.
The operation of my device is as follows: To crank an engine, the operator first takes hold of the crank 11 and throws his weight against the outer end of shaft 13, which shifts said shaft and the female clutch member 17 inwardly from the position shown in Figs. 1 and 3 to that shown in Fig. 4, which interlocks the clutch members. Then by turning the crank and shaft 13 in the direction permitted by the ratchet and pawls, the crank-shaft 3, and the fly wheel (not shown) of the engine may be started in the running direction. During the cranking operation the operator should maintain his pressure against the end of shaft 13, so as to hold the clutch parts interlocked. As soon as the engine is started, the pressure upon shaft 13 should be relaxed, and then spring 19 will instantly shift the said shaft and clutch 17 back to resting position, (see Figs. 1 and 3) and thereby break the connection between the clutch parts. In case the engine backfires while the operator is in the act of cranking, as last described, and the engine is suddenly reversed, the pawls 25—25, one or both of which are always in positive engagement with the ratchet 24, will hold shaft 13 and crank 11 from being rotated in the direction reverse to that which the crank is being turned. Should the engine backfire or suddenly reverse, as described, the power of the engine is instantly exerted, through the positive connection between the pin 5 and the jaws 18, against the female clutch member 17 and sleeve 14, and not being allowed to rotate shaft 13 because of the ratchet and pawls, forces the said sleeve to the right along shaft 13, against the tension of a cushion spring 33 which is interposed between the end of sleeve 14 and the ratchet 24. The spring 33 is employed for holding the female clutch 17 extended beyond the end of shaft 13, for receiving the male clutch member for permitting the ordinary cranking work. By the provision of the spring 33, the sleeve 14 is allowed to yield away from the male clutch member sufficiently to break the positive connection between the clutch parts, as shown in Fig. 5, whenever the shaft 3 is reversed by the back-firing of the engine. If the operator continues to hold shaft 13 rigidly in the compressed position, as shown by the full lines in Figs. 4 and 5, each turn of the crankshaft 3 of the engine will cause the clutch sleeve 14 to reciprocate upon the shaft 13. In case the engine back-fires, the shaft 13 is held from backward rotation by the pawl 25 and the ratchet 24. The clutch member 17 being loosely mounted on shaft 13 will be rotated backward by pin 5. But the slots 16 are so inclined that their engagement with the pin 15, held stationary by shaft 13, causes the clutch member 17 to be moved outwardly on shaft 13 against the force of spring 33, thus breaking the connection between the crank 11 and the engine shaft 3. In order to facilitate the automatic releasing of the clutch parts, when the engine starts up in the running direction before the operator relaxes his pressure on the shaft 13, the face of the jaws 18, as 18' are formed into spiral cams, so that when the engine is driven forward by the firing of its cylinders, the clutch pin 5 will glide smoothly over the cam faces 18' and break the positive connection of the clutch. Under the foregoing construction and arrangement of the parts of the device, it is impossible for the engine, when driven in the wrong direction by reason of its back-firing, to effect the reversing of shaft 13 and crank 11, and thereby inflict any injury upon the person engaged in cranking the engine. And if the engine starts up in the right direction while the operator is rigidly holding shaft 13 in its compressed or operative position, the clutch connection will also be broken without danger of injuring the operator.

Obviously some changes or modifications of the parts of the device may be made without departing from the spirit of my invention, and I therefore do not wish to restrict myself to the precise construction, arrangement and application of the device as herein shown and described.

Having thus described my invention, what I claim as new and desire to secure by Letters Patent, is—

1. The combination with the crank-shaft of a gas engine, and a clutch member carried thereby, of an auxiliary shaft arranged in line with but spaced from the said clutch member, a clutch member carried by said auxiliary shaft comprising a sleeve and a cup-like head, said head having jaws for engaging and interlocking with the first clutch member, said sleeve capable of longitudinal and spiral movement on said auxiliary shaft for breaking the connection between said clutch members when the engine back-fires, a spring for holding said sleeve in extended position for interlocking with the first clutch member for starting the engine, and a crank for rotating said auxiliary shaft and said sleeve in one direction.

2. The combination with an engine and its crank-shaft, and a clutch member carried by said crank-shaft, of an auxiliary shaft supported in line with said crank shaft, means for normally holding said auxiliary shaft spaced from the crank-shaft, means for permitting said auxiliary shaft to be shifted end-wise toward said crank shaft, a yieldable clutch member carried by said auxiliary shaft and driven therewith, said clutch member adapted for interlocking with the first clutch member when said auxiliary shaft is shifted longitudinally, said second clutch member adapted for sliding on said auxiliary shaft for breaking the connection with said first clutch member when the engine back-fires, means for manually operating said auxiliary shaft in the direction for starting the engine, and means for preventing the rotation of said auxiliary shaft in the opposite direction by the back-firing of the engine.

3. The combination with the crank-shaft of an engine, and an auxiliary shaft arranged concentric to, but spaced from, said crank-shaft, of a two-part clutch adapted for operatively connecting said shafts for starting the engine, one member of said clutch being rigidly mounted on said crank-shaft, the second clutch member carried by said auxiliary shaft and capable of longitudinal movements on said shaft toward or away from said first clutch member, a spring for normally holding said second clutch member in engaging position, and a hand-crank for operating said shafts in the direction for starting the engine.

4. A safety cranking device, comprising a hollow cylinder, a shaft journaled in said cylinder, a ratchet gear carried by said shaft and a series of pawls carried by said cylinder for preventing the rotation of said shaft in one direction, a clutch member comprising a sleeve slidably mounted on said shaft and rotatable therewith, a spring for normally holding said sleeve partially extended beyond one end of said shaft, and a crank for manually operating said shaft and said sleeve in the opposite direction.

In testimony whereof I affix my signature in presence of two witnesses.

EDMUND B. CALKINS.

Witnesses:
 JEROME B. COOPER,
 F. R. CALKINS.

---

Copies of this patent may be obtained for five cents each, by addressing the "Commissioner of Patents, Washington, D. C."